United States Patent
Kosaka et al.

(10) Patent No.: US 11,660,928 B2
(45) Date of Patent: May 30, 2023

(54) AIR CONDITIONER

(71) Applicant: DENSO CORPORATION, Kariya (JP)

(72) Inventors: Sho Kosaka, Kariya (JP); Shinya Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 371 days.

(21) Appl. No.: 16/544,295

(22) Filed: Aug. 19, 2019

(65) Prior Publication Data

US 2019/0366798 A1 Dec. 5, 2019

Related U.S. Application Data

(63) Continuation of application No. PCT/JP2018/005624, filed on Feb. 19, 2018.

(30) Foreign Application Priority Data

Mar. 21, 2017 (JP) .............................. JP2017-054344

(51) Int. Cl.
*B60H 1/00* (2006.01)

(52) U.S. Cl.
CPC ... *B60H 1/00514* (2013.01); *B60H 2001/006* (2013.01)

(58) Field of Classification Search
CPC ................ B60H 2001/006; B60H 2001/00085
USPC ......................................... 454/143
See application file for complete search history.

(56) References Cited

U.S. PATENT DOCUMENTS

| 5,620,370 A * | 4/1997 | Umai .................... F04D 29/663 |
| | | 181/225 |
| 2016/0221414 A1* | 8/2016 | Nakamura ......... B60H 1/00428 |

FOREIGN PATENT DOCUMENTS

| CN | 205977816 U | * | 2/2017 | |
| JP | 10227299 A | * | 8/1998 | |
| JP | H10227299 A | | 8/1998 | |
| JP | 2009079568 A | | 4/2009 | |
| JP | 2009197623 A | | 9/2009 | |
| JP | 2015083449 A | * | 4/2015 | ......... B60H 1/00428 |

* cited by examiner

*Primary Examiner* — Allen R. B. Schult
(74) *Attorney, Agent, or Firm* — Harness, Dickey & Pierce, P.L.C.

(57) ABSTRACT

An air conditioner includes an air conditioning case, a blower fan, and a facing wall portion. The air conditioning case configures an air passage through which air to be blown into an interior flows. The blower fan is disposed inside the air conditioning case. The facing wall portion is disposed on an air flow upstream side of the blower fan to face a suction port of the blower fan. The air conditioning case has a facing surface that faces the facing wall portion and in which through holes are formed. The air conditioning case has a closed space formed therein on an opposite side of the facing surface with respect to the air passage and communicating with the air passage via the through holes. The through holes and the closed space form a resonator having a predetermined resonance frequency.

18 Claims, 4 Drawing Sheets

AIR CONDITIONER

CROSS REFERENCE TO RELATED APPLICATION

The present application is a continuation application of International Patent Application No. PCT/JP2018/005624 filed on Feb. 19, 2018, which designated the U.S. and claims the benefit of priority from Japanese Patent Application No. 2017-054344 filed on Mar. 21, 2017. The entire disclosures of all of the above applications are incorporated herein by reference.

TECHNICAL FIELD

The present disclosure relates to an air conditioner that includes a blower fan.

BACKGROUND

An air conditioner including a blower fan generates noise with the rotation of the blower fan, and a noise reducing structure may be provided in the blower.

SUMMARY

An air conditioner according to the present disclosure includes an air conditioning case, a blower fan, and a facing wall portion. The air conditioning case configures an air passage through which air to be blown into an interior flows. The blower fan is disposed inside the air conditioning case. The facing wall portion is disposed on an air flow upstream side of the blower fan to face to a suction port of the blower fan. The air conditioning case has a facing surface that face to the facing wall portion and in which a through hole is formed. The air conditioning case has a closed space formed therein on an opposite side of the air passage with respect to the facing surface and communicating with the air passage via the through hole. The through hole and the closed space configure a resonator having a predetermined resonance frequency. Thus, noise generated upstream of the blower fan in the air flow direction can be effectively reduced.

DESCRIPTION OF EMBODIMENTS

Figure 1:
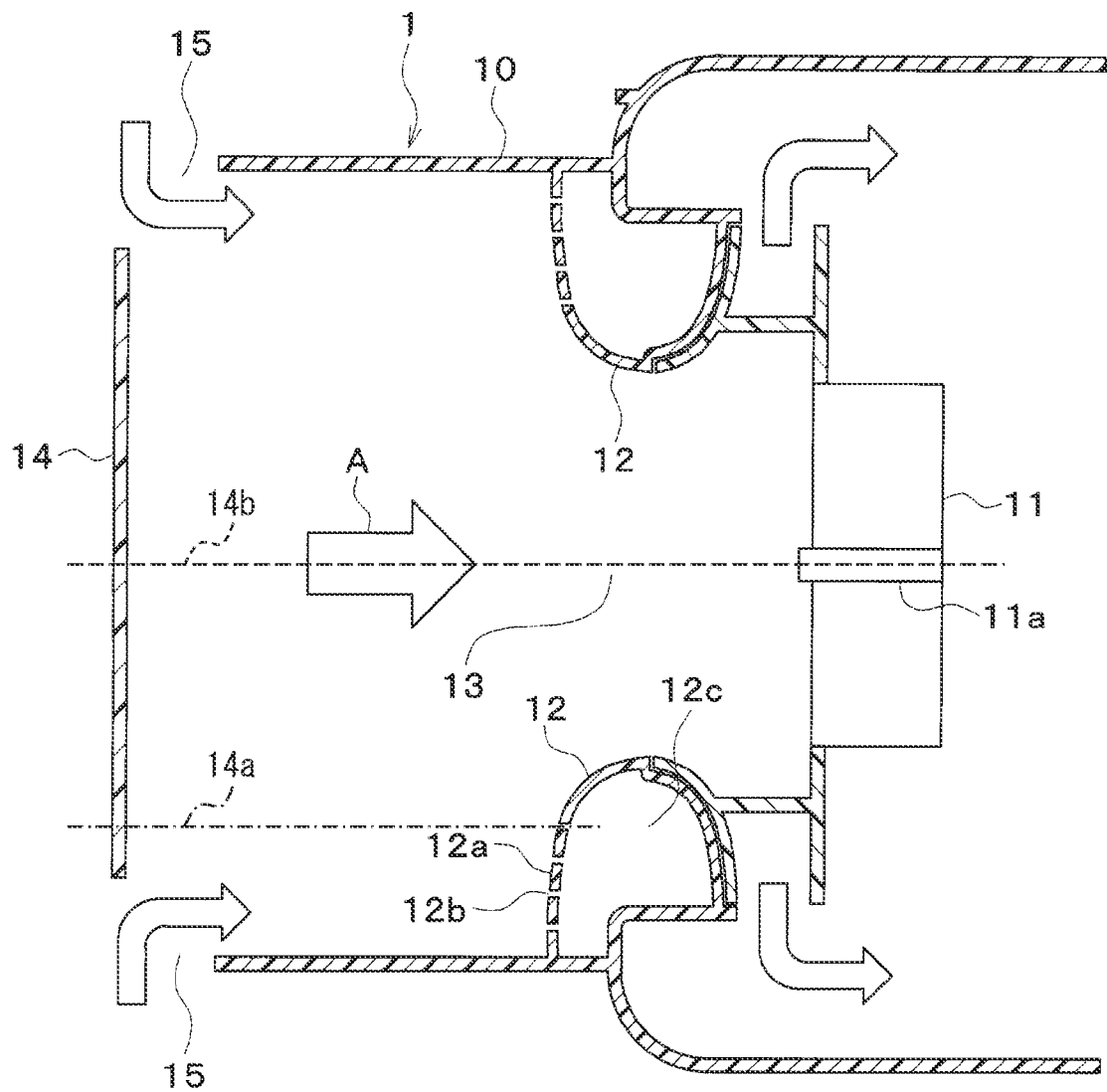
FIG. 1 is a cross-sectional view of a vehicle air conditioner according to a first embodiment.

A blower of an air conditioner may be configured to reduce noise with a resonator using a bell mouth. In this blower, the bell mouth may be provided with the resonator formed by an opening and a cavity that communicates with the opening, so that noise is reduced by causing the resonance frequency of the resonator to coincide with the frequency of noise generated by the rotation of the blower fan.

In this case, the blower described can obtain a muffling effect on the noise generated by the blower fan itself, but only has a low muffling effect on noise generated upstream of the blower fan in the air flow direction and the like. Since the opening is provided on a side surface of the bell mouth that extends along its air flow passage, an air flow is disturbed in the vicinity of a wall portion surface of the bell mouth.

The present disclosure is to reduce noise while suppressing the disturbance of an air flow in an air conditioner including a blower fan.

An air conditioner according to at least an embodiment of the present disclosure includes an air conditioning case, a blower fan, and a facing wall portion. The air conditioning case configures an air passage through which air to be blown into an interior flows. The blower fan is disposed inside the air conditioning case. The facing wall portion is disposed on an air flow upstream side of the blower fan to face to a suction port of the blower fan. The air conditioning case has a facing surface that face to the facing wall portion and in which a through hole is formed. The air conditioning case has a closed space formed therein on an opposite side of the air passage with respect to the facing surface and communicating with the air passage via the through hole. The through hole and the closed space configure a resonator having a predetermined resonance frequency.

According to the above structure, the through hole configuring the resonator is formed on the facing surface that faces to the facing wall portion. Thus, noise generated upstream of the blower fan in the air flow direction can be effectively reduced.

The through hole is formed on the facing surface and thereby located away from the main stream of the air. Consequently, the through hole can suppress the disturbance of the air flow.

Hereinafter, embodiments of the present disclosure will be described with reference to the drawings. In the respective embodiments below, the same or equivalent parts will be denoted by the same reference characters.

First Embodiment

A first embodiment will be described below with reference to the accompanied drawings. As shown in FIG. 1, a vehicle air conditioner 1 of the present embodiment includes an air conditioning case 10. The air conditioning case 10 configures an air passage for air to be blown into the interior of a vehicle cabin. In FIG. 1, the direction from left to right refers to an air flow direction A. Although not shown in FIG. 1, a heat exchanger or the like for adjusting the temperature of air is provided inside the air conditioning case 10.

A blower fan 11 is provided at the center of the inside of the air conditioning case 10. The blower fan 11 blows air toward the interior of the vehicle cabin. The blower fan 11 of the present embodiment is a centrifugal fan, and is configured as an electric blower that is driven by an electric motor. The blower fan 11 is disposed such that its rotation axis 11a is in parallel with the air flow direction A.

A bell mouth 12 is provided upstream of the blower fan 11 in the air flow direction A within the air conditioning case 10. In the air conditioning case 10, the bell mouth 12 is shaped to expand from a wall portion of the air conditioning case 10, which is parallel to the air flow direction A, toward the inside of the air conditioning case 10. The bell mouth 12 is formed annularly as viewed in the air flow direction A.

The cross-sectional area of the air passage formed inside the air conditioning case 10 is narrowed by the bell mouth 12 toward the blower fan 11. The air flowing through the air passage is guided to the bell mouth 12 and then introduced into the blower fan 11. That is, the bell mouth 12 forms a suction port 13 that introduces the air into the blower fan 11.

In the air conditioning case 10, a facing wall portion 14 is provided upstream of the blower fan 11 in the air flow direction A. At a peripheral edge of the facing wall portion 14, an inflow port 15 is formed, causing the air to flow into the air conditioning case 10.

The facing wall portion 14 is disposed to face to the blower fan 11 and the suction port 13. The area of the facing wall portion 14 is larger than an opening area of the suction port 13 as viewed from the air flow direction A. The vicinity of the end of the facing wall portion 14 overlaps with the bell mouth 12 as viewed from the air flow direction A. In the present embodiment, the facing wall portion 14 is disposed so as to be orthogonal to the axial direction of the rotation axis 11a of the blower fan 11.

The bell mouth 12 has a facing surface 12a that faces to the facing wall portion 14. Through holes 12b are formed in the facing surface 12a. The plurality of through holes 12b are provided therein. Each of the through holes 12b is formed in an upstream side wall portion of the bell mouth 12 in the air flow direction A. The upstream side wall portion extends in the direction that intersects the air flow direction A and is located at the most upstream side of the bell mouth 12 in the air flow direction A.

Figure 2:
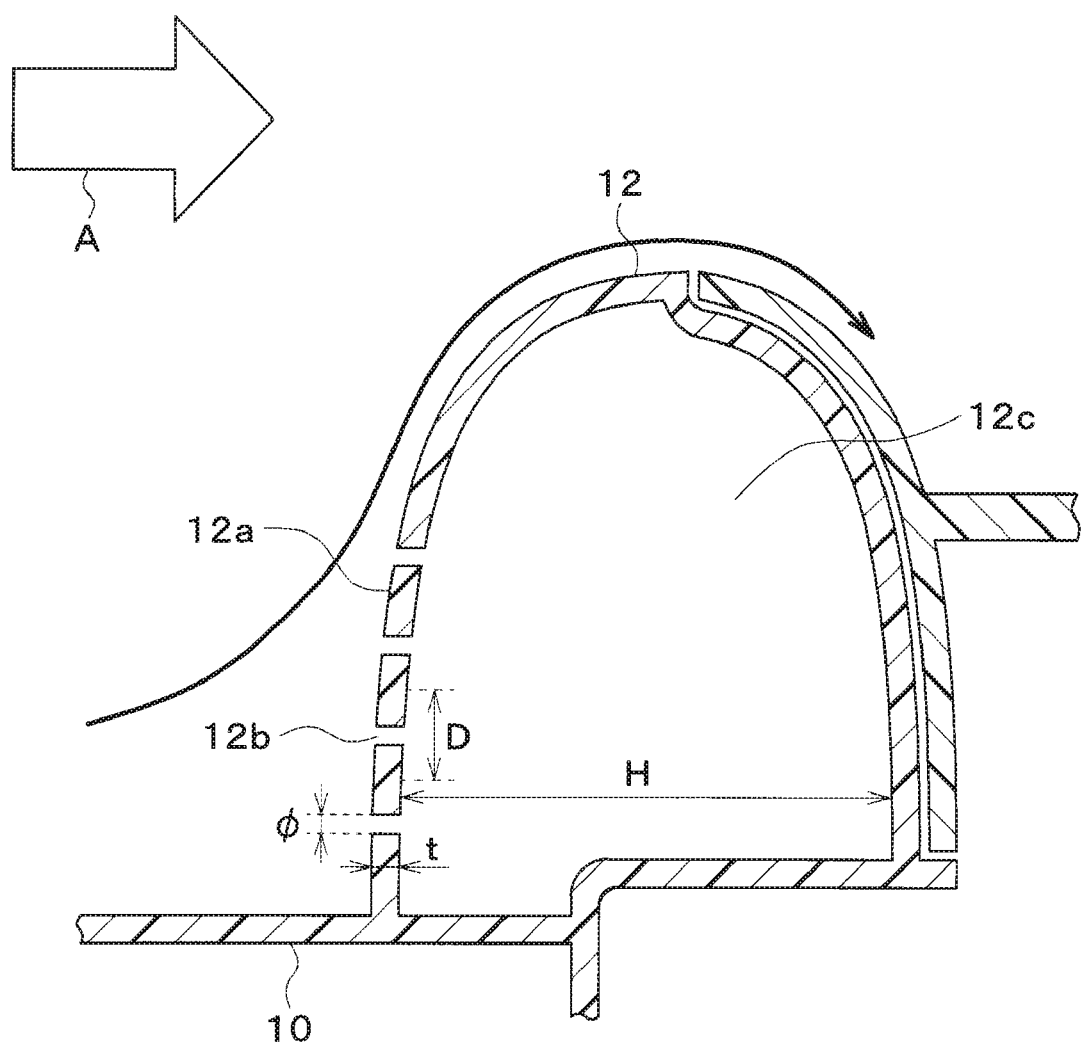
FIG. 2 is an enlarged cross-sectional view of a bell mouth.

As shown in FIG. 2, each through hole 12b is formed in a water stop area which is formed by the bell mouth 12 inside the air conditioning case 10. The water stop area is an area that does not interfere with the main stream of air flowing through the air passage along the air flow direction A. The air does not easily flow through the water stop area. The flow rate of air flowing through the water stop area is slower than the flow rate of air flowing through other portions inside the air conditioning case 10. For example, the water stop area can be regarded as a portion where the flow rate of air flowing along the surface of the bell mouth 12 is 40% or less of the flow rate of air passing through the suction port 13.

An axial center line 14a including an axial center of the through hole 12b extends along the air flow direction A and the rotation axis 11a of the blower fan 11. In the present embodiment, the axial center line 14a including the axial center of the through hole 12b is substantially parallel to the air flow direction A and the rotation axis 11a of the blower fan 11. Thus, the axial center line 14a including the axial center of the through hole 12b is not orthogonal to the air flow direction A.

The wall portion of the bell mouth 12 where the through holes 12b are formed is substantially parallel to the facing wall portion 14 and substantially perpendicular to the air flow direction A and the rotation axis 11a of the blower fan 11.

The through hole 12b may be formed at a portion of the bell mouth 12 that faces the facing wall portion 14, and the axial center of the through hole 12b may face the facing wall portion 14. That is, an extension line obtained by virtually extending the axial center of the through hole 12b may intersect the facing wall portion 14. The axial center of the through hole 12b desirably faces a portion of the facing wall portion 14 that is closer to the through hole 12b than a portion of the facing wall portion 14 intersecting the rotation axis 11a of the blower fan 11. In other words, a distance between a second point and the through hole 12b is shorter than a distance between a first point and the through hole 12b when the first point is defined as a point of the facing wall portion 14 that intersects an extension line 14b virtually extended the rotation axis 11a of the blower fan 11, and the second point is defined as a point of the facing wall portion 14 that intersects the extension line obtained by extending the axial center line 14a including the axial center of the through hole 12b.

The air conditioning case 10 has a closed space 12c formed on the opposite side of the air passage with respect to the facing surface 12a and communicating with the air passage via the through holes 12b. Specifically, the closed space 12c is formed inside the bell mouth 12. The bell mouth 12 is shaped to expand toward the inside of the air conditioning case 10 and has its back space serving as a dead space. The closed space 12c is formed using the back space of the bell mouth 12. The closed space 12c communicates with the air passage formed inside the air conditioning case 10 via the through holes 12b. The closed space 12c does not communicate with the outside in portions other than the through holes 12b. In other words, the inside of the closed space 12c communicates with the outside of the closed space 12c only via the through holes 12b.

In the vehicle air conditioner 1, noise is generated with the rotation of the blower fan 11. For example, noise is generated by resonance between the blower fan 11 and the facing wall portion 14. The noise caused by the resonance between the blower fan 11 and the facing wall portion 14 is generated upstream of the blower fan 11 in the air flow direction A. The frequency of the noise varies depending on a distance between the blower fan 11 and the facing wall portion 14, or other factors.

The bell mouth 12 of the present embodiment includes the through holes 12b and the closed space 12c, thereby configuring a Helmholtz resonator. The resonance frequency $f_0$ of the resonator can be determined by the following formula 1:

$$f_0 = \frac{c}{2\pi} \sqrt{\frac{P}{(t + 0.8\phi)H}} \quad (1)$$

where c is the speed of sound, P is an aperture ratio of the through hole 12b, $\phi$ is the hole diameter of the through hole 12b, t is the thickness of the wall portion of the bell mouth 12, D is the distance between adjacent through holes 12b, and H is the depth of the closed space 12c.

The aperture ratio P of the through hole 12b can be determined by the following formula 2:

$$P = \frac{\pi \phi^2}{4D^2} \quad (2)$$

In the present embodiment, the hole diameter $\phi$ of the through hole 12b is set at approximately 2 to 6 mm. When the hole diameter $\phi$ is set at 2 mm, the resonance frequency becomes around 400 Hz. When the hole diameter $\phi$ is set at 6 mm, the resonance frequency becomes around 1000 Hz. Here, 400 Hz and 1000 Hz are main frequencies of noise generated in the vehicle air conditioner 1.

The resonator configured by the bell mouth 12 can absorb sound with a frequency corresponding to the resonance frequency $f_0$ by using the resonance between the air in the through holes 12b and an air layer in the closed space 12c. That is, the bell mouth 12 functions as a resonance silencer.

According to the vehicle air conditioner 1 with the above-mentioned configuration, noise generated by the rotation of the blower fan 11 can be resonance-absorbed by the resonator configured by the bell mouth 12. Consequently, the noise can be reduced. In the present embodiment, the through holes 12b included in the resonator are formed in the upstream side wall portion of the bell mouth 12 in the air flow direction A. Thus, the noise generated upstream of the blower fan 11 in the air flow direction A can be effectively reduced.

In the present embodiment, the bell mouth 12 configures the resonator while forming the suction port 13 of the blower fan 11 for the air. Thus, the bell mouth 12 can be effectively used, thereby eliminating the need to independently provide any resonator for noise reduction.

In the present embodiment, the through holes 12b are formed in the facing surface 12a of the bell mouth 12 that faces to the facing wall portion 14. Thus, the through holes 12b are formed to be located away from the main stream of the air, making it possible to suppress the disturbance of the air flow due to the presence of the through hole 12b.

In the present embodiment, the through holes 12b of the bell mouth 12 are provided in the water stop area of the bell mouth 12. Thus, the disturbance of the main stream of the air can be suppressed as much as possible.

Second Embodiment

Next, a second embodiment will be described with reference to FIG. 3.

Figure 3:
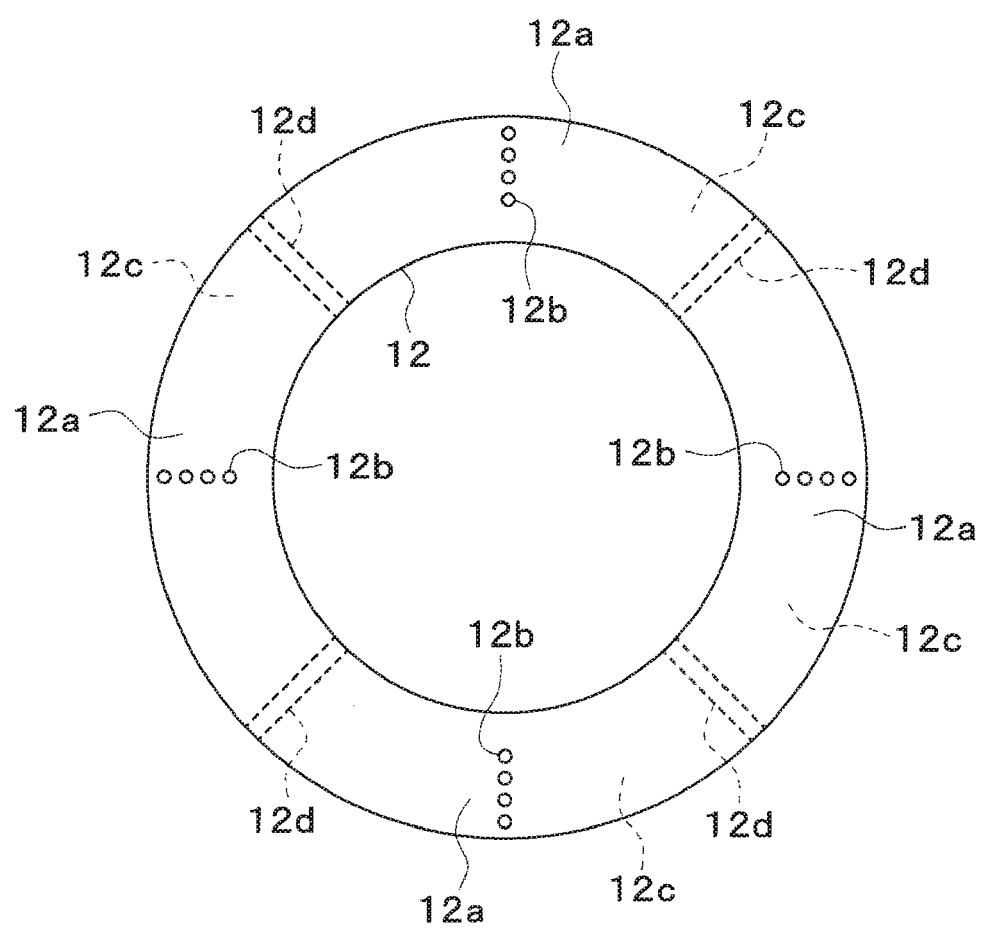
FIG. 3 is a front view of a bell mouth according to a second embodiment.

As shown in FIG. 3, in the second embodiment, a plurality of closed spaces 12c are provided in the bell mouth 12. Specifically, partition portions 12d are provided within the bell mouth 12 to divide the closed space 12c into a plurality of closed spaces 12c. The through holes 12b are respectively formed in the respective divided closed spaces 12c. A plurality of resonators can be configured by the respective divided closed spaces 12c and the corresponding through holes 12b.

The resonance frequencies of the plurality of resonators can be differentiated by making the respective plurality of closed spaces 12c different in terms of the size of the through hole 12b, the distance between the adjacent through holes 12b, the aperture ratio of the through hole 12b, and the like. Consequently, noise with a plurality of frequencies, which has been generated with the rotation of the blower fan 11, can be resonance-absorbed by the plurality of resonators. Thus, the noise can be effectively reduced even in the presence of a plurality of kinds of noise with different frequencies.

Third Embodiment

Next, a third embodiment will be described with reference to FIG. 4.

Figure 4:
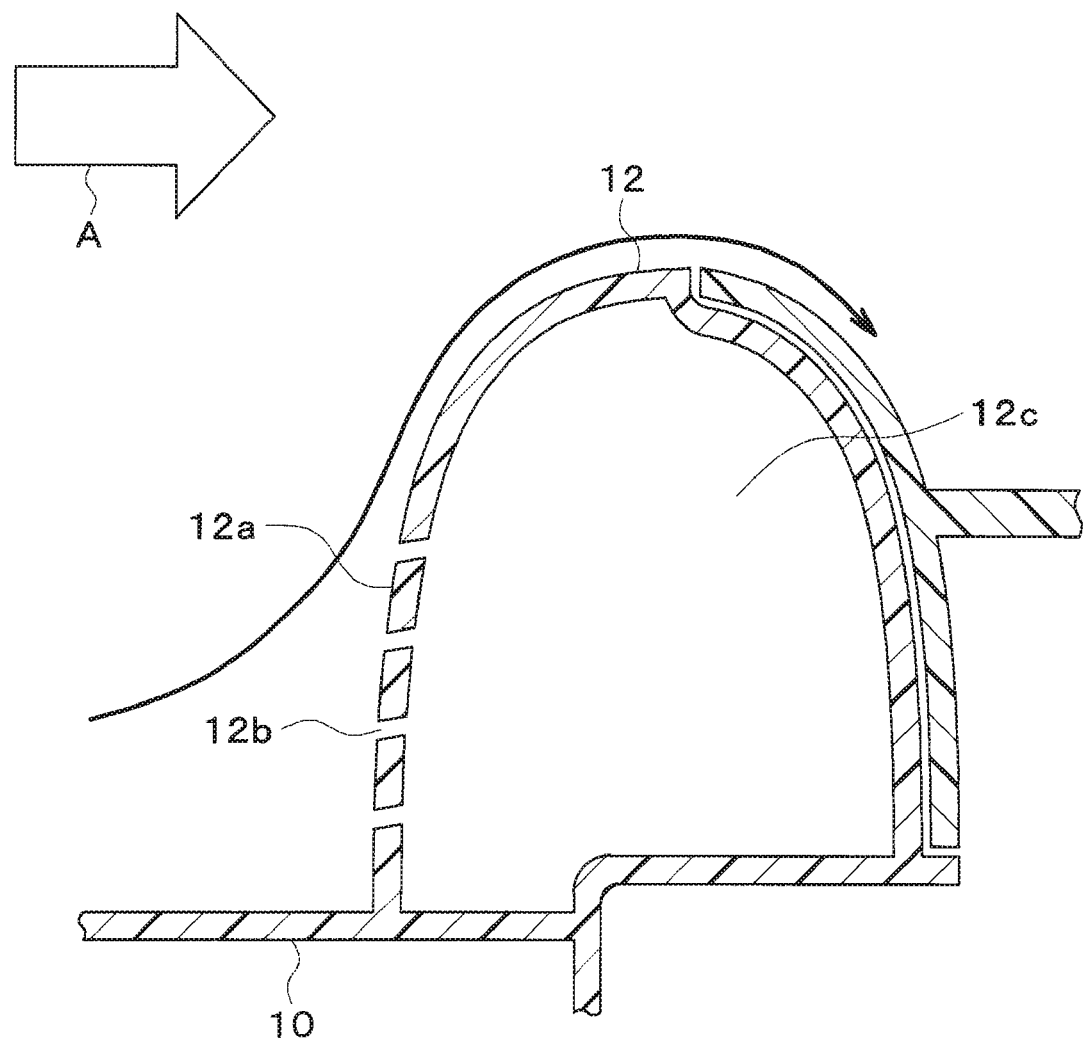
FIG. 4 is an enlarged cross-sectional view of a bell mouth according to a third embodiment.

As shown in FIG. 4, in the third embodiment, each of the through holes 12b formed in the bell mouth 12 is inclined with respect to the air flow direction A and the rotation axis 11a of the blower fan 11. In the example shown in FIG. 4, the air flow direction A is the horizontal direction, and the axial center of the through hole 12b is inclined with respect to the horizontal direction. Specifically, the through hole 12b is inclined from the upstream side to the downstream side in the air flow direction A as well as from the lower side to the upper side, so that the through hole 12b is in a state of being oriented downward toward the front.

By forming the through holes 12b so as to be oriented downward toward the front in this way, water does not easily enter the closed space 12c via the through holes 12b even when the water is present inside the air conditioning case 10. The closed space 12c does not communicate with the outside in portions other than the through holes 12b, so that if water enters the inside of the closed space 12c, the water cannot be easily discharged from the closed space 12c. Thus, the inclination of the through hole 12b is effective in suppressing the entering of the water into the closed space 12c.

The closed space 12c located on the lower side in the gravitational direction among the plurality of closed spaces 12c may have a water drain hole at a lower end thereof in the gravitational direction. The closed space 12c provided with the water drain hole slightly reduces its function as the resonator, but can effectively discharge water that has entered the inside of the closed space 12c.

Other Embodiments

The present disclosure is not limited to the above-mentioned embodiments, and various modifications and changes can be made to those embodiments without departing from the spirit of the present disclosure in the following ways. The means disclosed in the above-mentioned respective embodiments may be combined together within the feasible range as appropriate.

(1) In the above-mentioned embodiments, an example has been described in which the present disclosure is applied to the vehicle air conditioner 1, but the present disclosure is not limited thereto. The present disclosure can also be applied to any air conditioner other than that for the vehicle.

(2) In the above-mentioned embodiments, the resonator is configured by forming the plurality of through holes 12b in the bell mouth 12, but the present disclosure is not limited thereto. The bell mouth 12 may be provided with at least one through hole 12b. In the configuration of the second embodiment which is provided with the plurality of closed spaces 12c, at least one through hole 12b may be formed in each closed space 12c.

(3) In the above-mentioned embodiments, the through hole 12b is formed in the upstream side wall portion in the air flow direction A of the bell mouth 12, but the present disclosure is not limited thereto. The through hole 12b may be formed on a downstream side wall portion of the bell mouth 12 in the air flow direction A. In this case, a significant effect of reducing noise can be obtained for the noise generated downstream of the blower fan 11 in the air flow direction A.

(4) The above-mentioned embodiments use, as a resonator, the bell mouth 12 that forms the suction port 13 of the blower fan 11, but the present disclosure is not limited thereto. Any component other than the bell mouth 12 may be used as the resonator.

What is claimed is:

1. An air conditioner comprising:
an air conditioning case that configures an air passage through which air to be blown into an interior flows;
a blower fan disposed inside the air conditioning case; and
a facing wall portion disposed on an air flow upstream side of the blower fan, facing a suction port of the blower fan, an area of the facing wall portion is larger than an area of an opening of the suction port of the blower fan, wherein
the facing wall portion is continuous from one peripheral edge to an opposite peripheral edge,
an inflow port is provided between at least one of the peripheral edges of the facing wall portion and the air conditioning case to cause the air to flow into the air conditioning case through the inflow port, the air conditioning case has a facing surface in which a through hole is formed, the facing surface being provided to face the facing wall portion, the air conditioning case partially forms closed space on an opposite side of the facing surface with respect to the air passage, the closed space communicating with the air passage via the through hole, the through hole and the closed space are configured to form a resonator having a predetermined resonance frequency, the air conditioning case comprises a portion that extends outwardly in an axial direction from the facing surface toward the inflow port, and the closed space is partially formed by the portion of the air conditioning case.

2. The air conditioner according to claim 1, wherein the through hole is formed such that the through hole faces the facing wall portion.

3. The air conditioner according to claim 2, wherein a length of an axial center line extending from an axial center of the through hole to the facing wall portion is less than a length of an extension line virtually extending from a rotation axis of the blower fan to the facing wall portion.

4. The air conditioner according to claim 1, wherein the facing surface is a facing surface of a bell mouth expanding from the air conditioning case toward the air passage to configure the suction port.

5. The air conditioner according to claim 4, wherein the through hole is provided in a water stop area of the facing surface of the bell mouth.

6. The air conditioner according to claim 4, wherein the closed space is a back space of the bell mouth formed on an opposite side of the facing surface with respect to the air passage.

7. The air conditioner according to claim 1, wherein the closed space is divided into a plurality of closed spaces, and one or more of the through holes are formed in each of the divided closed spaces.

8. The air conditioner according to claim 1, wherein the through hole is inclined such that an axial center line including an axial center is angled relative to an air flow direction, wherein the air flow direction is generally horizontal, such that the through hole is upwardly inclined from an upstream side to a downstream side in the air flow direction.

9. The air conditioner according to claim 1, wherein the inflow port includes an inflow port provided at each peripheral edge of the facing wall portion to cause the air to flow into the air conditioning case through each inflow port.

10. The air conditioner according to claim 1, wherein an axial center line including an axial center of the through hole is substantially parallel to an air flow direction and a rotation axis of the blower fan.

11. The air conditioner according to claim 1, wherein the through hole is closer to the facing wall portion than the blower fan.

12. The air conditioner according to claim 1, wherein at least two through holes are formed in the facing surface and axial center lines including axial centers of each of the through holes extend in a direction parallel to each other.

13. The air conditioner according to claim 1, wherein the facing surface faces both the facing wall portion and the inflow port, and the closed space communicates with the air passage via the through hole at an air flow upstream side of the blower fan.

14. The air conditioner according to claim 1, wherein the closed space is partially formed by a step shaped portion of the air conditioning case.

15. The air conditioner according to claim 8, wherein the through hole is a plurality of through holes formed in the facing surface and axial center lines including axial centers of each of the plurality of through holes extend in a direction parallel to each other.

16. An air conditioner comprising:

an air conditioning case that configures an air passage through which air to be blown into an interior flows;

a blower fan disposed inside the air conditioning case; and a facing wall portion disposed on an air flow upstream side of the blower fan, facing a suction port of the blower fan, an area of the facing wall portion is larger than an area of an opening of the suction port of the blower fan, wherein the facing wall portion is continuous from one peripheral edge to an opposite peripheral edge, an inflow port is provided between at least one of the peripheral edges of the facing wall portion and the air conditioning case to cause the air to flow into the air conditioning case through the inflow port, the air conditioning case has a facing surface in which a plurality of through holes are formed, the facing surface being provided to face the facing wall portion, the air conditioning case has a closed space formed therein on an opposite side of the facing surface with respect to the air passage, the closed space communicating with the air passage via the through holes, the through holes and the closed space are configured to form a resonator having a predetermined resonance frequency, the through holes are inclined such that an axial center line including an axial center is angled relative to an air flow direction, wherein the air flow direction is generally horizontal, such that the through holes are upwardly inclined from an upstream side to a downstream side in the air flow direction, and the through holes are formed in the facing surface and axial center lines including axial centers of each of the through holes extend in a direction parallel to each other.

17. The air conditioner according to claim 16, wherein the air conditioning case extends outwardly in an axial direction from the facing surface toward the inflow port, and the closed space is partially formed by a portion of the air conditioning case extending perpendicularly to the axial direction.

18. The air conditioner according to claim 16, wherein the air conditioning case extends outwardly in an axial direction from the facing surface toward the inflow port, and the closed space is partially formed by a step shaped portion of the air conditioning case.

* * * * *